United States Patent
Eitzinger et al.

(10) Patent No.: US 9,447,860 B2
(45) Date of Patent: *Sep. 20, 2016

(54) COMPONENT WITH AN ADAPTIVE COATING

(75) Inventors: Guenter Eitzinger, Timelkam (AT); Klaus Preinfalk, Niederneukirchen (AT)

(73) Assignee: High Tech Coatings GmbH, Laakirchen (AT)

(*) Notice: Subject to any disclaimer, the term of this patent is extended or adjusted under 35 U.S.C. 154(b) by 74 days.

This patent is subject to a terminal disclaimer.

(21) Appl. No.: 14/115,927

(22) PCT Filed: May 10, 2012

(86) PCT No.: PCT/AT2012/050067
§ 371 (c)(1),
(2), (4) Date: Dec. 19, 2013

(87) PCT Pub. No.: WO2012/151604
PCT Pub. Date: Nov. 15, 2012

(65) Prior Publication Data
US 2014/0102234 A1    Apr. 17, 2014

(30) Foreign Application Priority Data
May 11, 2011 (AT) .................. A 664/2011

(51) Int. Cl.
*B32B 5/14* (2006.01)
*F16H 55/06* (2006.01)
*F16H 57/04* (2010.01)

(52) U.S. Cl.
CPC .......... *F16H 55/06* (2013.01); *F16H 57/041* (2013.01); *Y10T 74/1987* (2015.01); *Y10T 74/19679* (2015.01)

(58) Field of Classification Search
None
See application file for complete search history.

(56) References Cited

U.S. PATENT DOCUMENTS

| | | | |
|---|---|---|---|
| 2,075,995 A | 4/1937 | Morgan | |
| 3,636,792 A | 1/1972 | Vigh | |
| 4,184,380 A | 1/1980 | Rivin | |
| 4,594,294 A | 6/1986 | Eichen et al. | |
| 4,612,256 A * | 9/1986 | Neuhauser et al. | 428/547 |
| 4,680,438 A * | 7/1987 | Witting et al. | 200/268 |
| 4,946,747 A * | 8/1990 | Bergmann et al. | 428/653 |
| 5,955,145 A * | 9/1999 | Kalvala et al. | 427/246 |
| 6,379,754 B1 * | 4/2002 | Schlegel et al. | 427/446 |
| 6,537,683 B1 * | 3/2003 | Staschko et al. | 428/610 |
| 7,211,338 B2 * | 5/2007 | Strangman | 428/698 |
| 7,556,864 B2 | 7/2009 | Yamanishi et al. | |
| 7,686,734 B2 | 3/2010 | Mordukhovich et al. | |
| 7,910,217 B2 * | 3/2011 | Rai et al. | 428/457 |

(Continued)

FOREIGN PATENT DOCUMENTS

| | | | |
|---|---|---|---|
| CN | 1678848 A | 10/2005 | |
| CN | 101358365 | * 2/2009 | C25D 15/00 |

(Continued)

OTHER PUBLICATIONS

International Search Report of PCT/AT2012/050067, mailed Sep. 26, 2012.

*Primary Examiner* — Humera Sheikh
*Assistant Examiner* — Seth Dumbris
(74) *Attorney, Agent, or Firm* — Collard & Roe, P.C.

(57) ABSTRACT

A component includes a component body which has a toothed section. An adaptive coating is applied, at least in parts, to the toothed section, the coating having a thickness of a maximum 5 μm. The adaptive coating may have a hardness gradient that has an increasing hardness from an outer coating surface in the direction towards the component body.

11 Claims, 11 Drawing Sheets

(56) References Cited

U.S. PATENT DOCUMENTS

Figure 1:
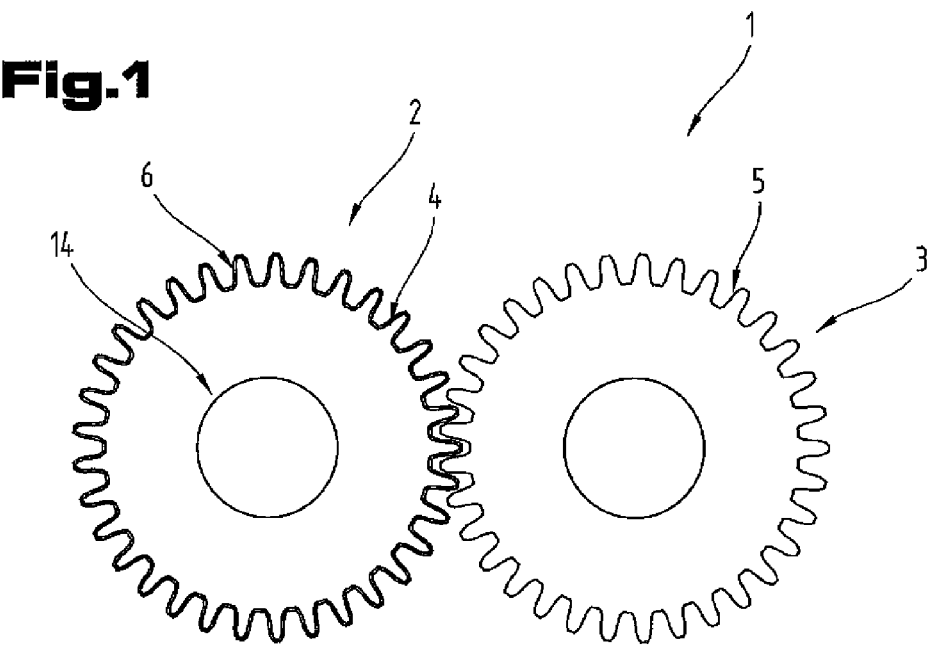

| | | | |
|---|---|---|---|
| 8,029,917 B2* | 10/2011 | Spain et al. | 428/673 |
| 2005/0274215 A1* | 12/2005 | Bishop et al. | 74/425 |
| 2008/0170960 A1 | 7/2008 | Kotthoff et al. | |
| 2008/0194377 A1 | 8/2008 | Mordukhovich et al. | |
| 2009/0155479 A1 | 6/2009 | Xiao et al. | |
| 2010/0040864 A1* | 2/2010 | McGilvray | F16C 33/12 428/323 |

FOREIGN PATENT DOCUMENTS

| | | | |
|---|---|---|---|
| DE | 10 2005 027144 A1 | 12/2006 | |
| EP | 1552895 A1 | 7/2005 | |
| GB | 1 139 522 A | 1/1969 | |
| JP | 07214428 * | 8/1995 | B23P 15/14 |
| JP | H11-210866 A | 8/1999 | |
| JP | 2006-327516 A | 12/2006 | |
| WO | 2004/022273 A2 | 3/2004 | |

* cited by examiner

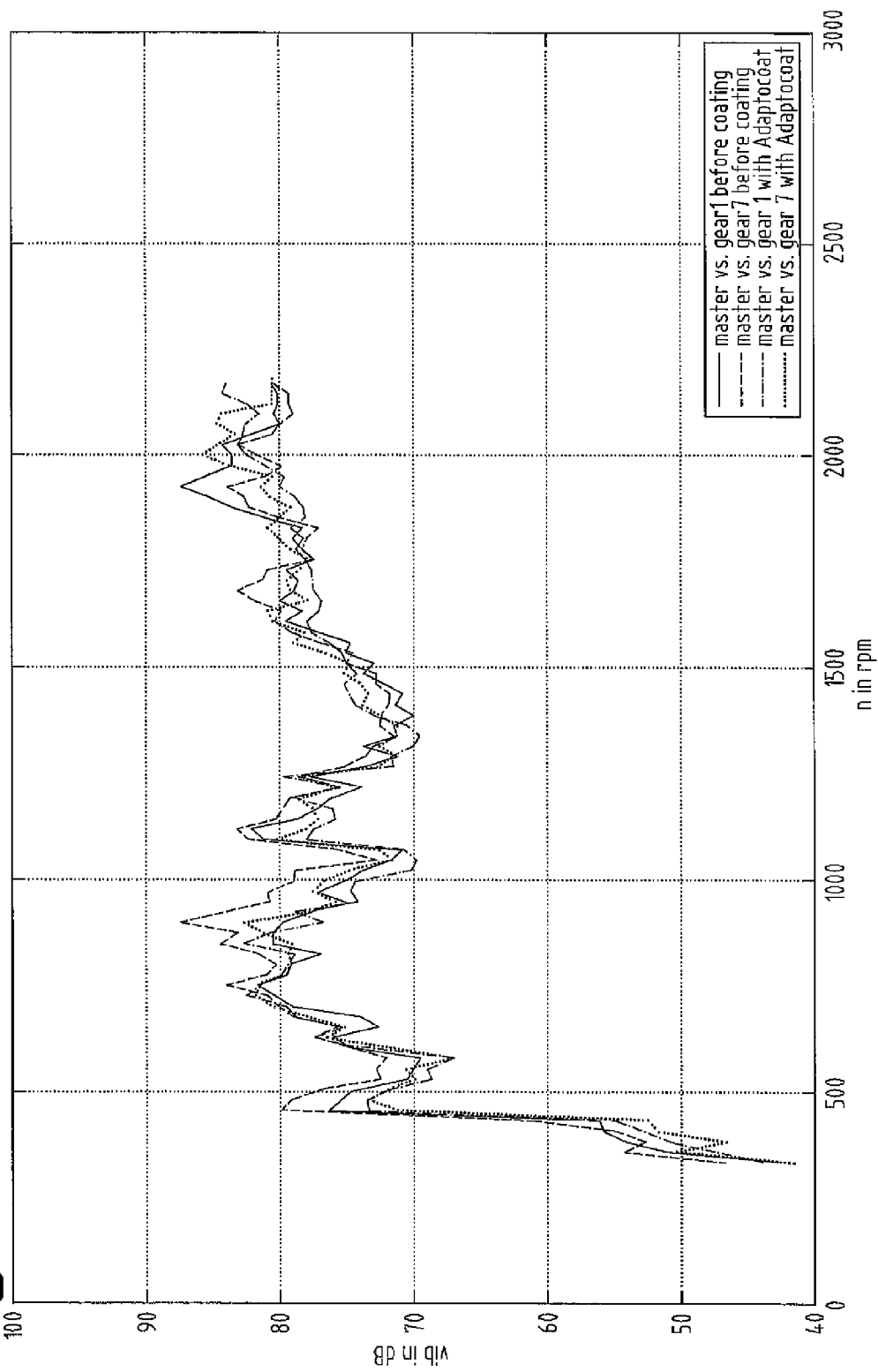

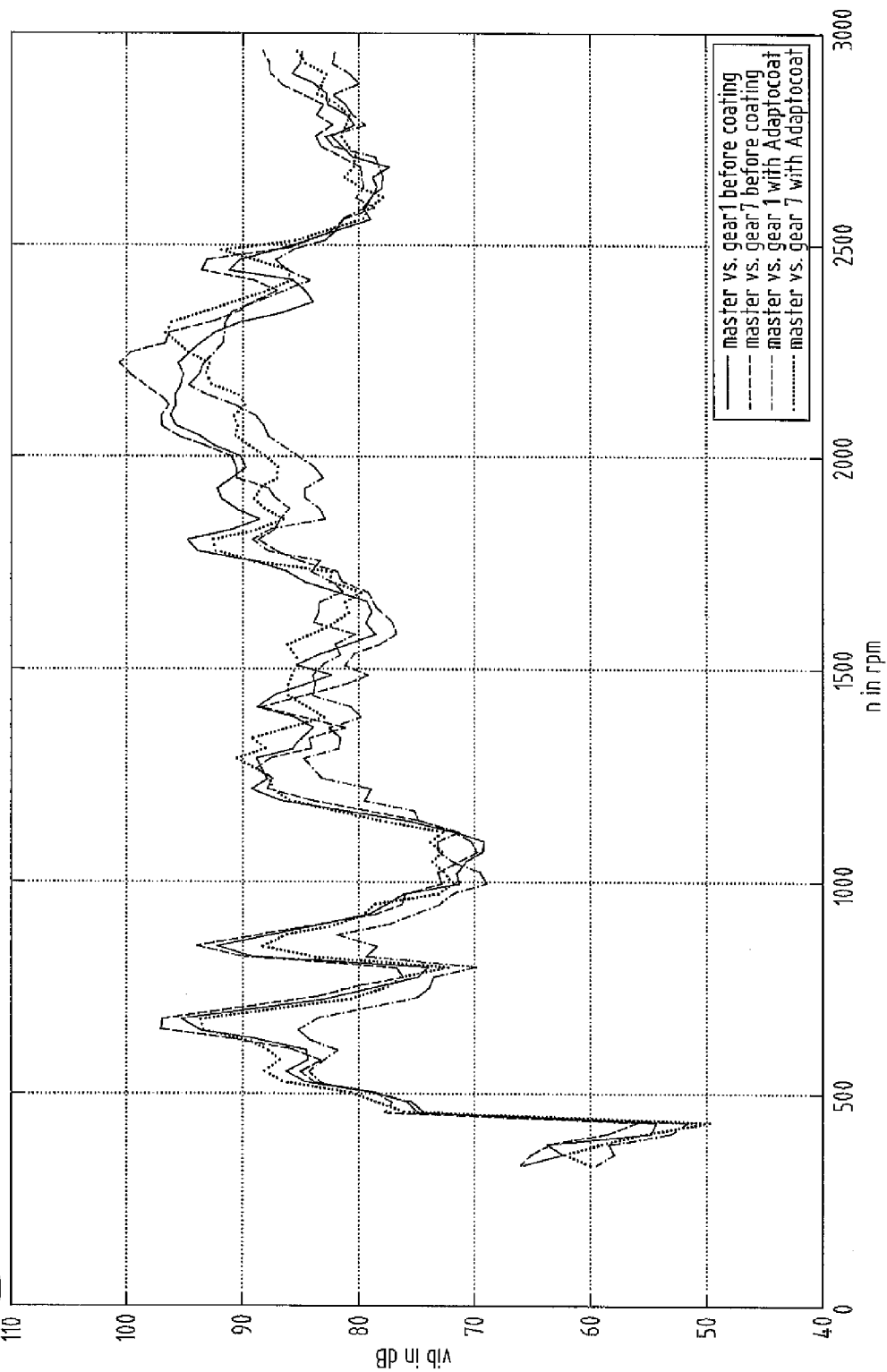

COMPONENT WITH AN ADAPTIVE COATING

CROSS REFERENCE TO RELATED APPLICATIONS

This application is the National Stage of PCT/AT2012/050067 filed on May 10, 2012, which claims priority under 35 U.S.C. §119 of Austrian Application No. A 664/2011 filed on May 11, 2011, the disclosure of which is incorporated by reference. The international application under PCT article 21(2) was not published in English.

The invention relates to a component comprising a component body which has a toothing, as well as an assembly comprising at least two components which have at least one toothing each, with the at least two toothings being in meshing engagement.

The quality of the toothing of gears is usually classified in twelve quality categories according to DIN 3963, with 1 being the finest and 12 the rawest toothing quality. The classification is effected after the manufacturing process, and the toothing having quality 1-6 is honed, that having quality 2-7 is grinded, that having quality 5-7 is scraped, that having a quality of 5-9 is hobbed, planed by generating or shaped by generating, that having quality 7-12 is profile milled or form-shaped and that having quality 8-12 is punched, pressed or sintered, and it is also possible for the processing methods to be carried out in a combined way. In other words: a high toothing quality of a toothed wheel can be achieved by laborious working, which causes higher production costs.

Prior art already describes coatings adjusting the tooth flank clearance of a meshing engagement. Those are usually configured to be polymer-based and are abraded after the running-in phase, as otherwise the desired tooth flank clearance is not produced in the thickness of the coating—or double coating, in the event that both meshing toothings are coated. Such coatings are therefore not suitable for improving the toothing quality.

Improving the microgeometry of the toothing represents a great effort in producing toothed wheels according to prior art.

It is the objective of the underlying invention to propose a toothed wheel having an improved microgeometry of the toothing.

Within the context of the invention, microgeometry refers to irregularities or roughness of the surface and form deviations on micro scale of up to 10μ.

This objective is on the one hand achieved by the above-mentioned component and on the other hand by the assembly, and an adaptive coating is at least applied to sections of the toothing of the component, which coating has a thickness of not more than 5μ, and at least one of the components of the assembly is embodied according to the invention.

Due to the configuration of the adaptive coating in the mentioned maximum layer thickness it is achieved that by plastic deforming the coating the contact ratio of the toothing, i.e. the portion of the contact area into a toothing of another toothing during the meshing engagement, is enlarged, with the result that the surface loading is reduced. During the deformation of the coating, by way of which material of the rough peaks is brought into the valleys between those peaks (usually, the irregularities of the surface below are copied when the coating is deposited), it is additionally possible that a hardening of the coating takes place, with the result that also the mechanical strength of the component, i.e. of the toothing of the component, can be increased. Due to this deformation it is additionally achieved that the roughness of the surface is at least partially leveled. It is using the invention thus possible that the coating improves the quality of the toothing by at least one quality grade, i.e. a toothing having quality 8 achieves quality 7 to 6 due to the coating. In other words: arranging the adaptive coating in the mentioned maximum layer thickness considerably improves the microgeometry of the surface of the toothing. It is thus possible for the components themselves to be produced by way of a more cost-efficient method, and by depositing the adaptive coating on the toothing no additional expensive hard-fine machining are necessary in order to achieve a higher toothing quality. The adaptive coating has furthermore the advantage that it abrasively wears only in those sections of the toothing that are extremely stressed during operation, i.e. the "leveling effect" survives over a long operation period. Due to the higher quality of the toothing achieved by the adaptive coating an improved acoustic behavior of the assembly equipped with this component is additionally achieved. In the event of the toothings exhibiting different qualities, the maximum layer thickness of the adaptive coating is adapted to the respective quality, i.e. to the respectively existing surface roughnesses. Since also the surface roughness of the toothing is copied to the coating during coating process—it is preferred if the same lay- or thickness is produced at least at approximately each coated place—the later support layer, which is produced by deforming the adaptive coating, should extend above the highest roughness peak of the toothing. Because of the adaptive coating it has been due to the reduction of the Hertzian contact stress possible to achieve an improvement with respect to the so-called pitting as well.

The toothing of the adaptive coating can optionally be pro-calibrated, e.g. by rolling.

It is preferred if the layer thickness is selected from a range having a lower limit of 1 μm and an upper limit of 4 μm.

It is preferred if a component having a higher quality of the toothing is used as a second component having a toothing being in meshing engagement with the component according to the invention, as this toothing may operate as "embossing toothing" for the adaptive coating, and thus the quality of the toothing of the entire assembly can be improved.

According to an embodiment it is provided that the adaptive coating has a hardness gradient exhibiting an increasing hardness from an outer coating surface in the direction of the component body. It is thereby achieved that the adaptive coating, which is in meshing engagement with another toothing of an additional component when the component is incorporated, can be embodied to be relatively soft, so that the deformation, i.e. the flattening of the profile peaks of the roughness profile can be carried out quickly and a better adhesion of the coating at the component body or a better fatigue strength is furthermore achieved due to the greater hardness at the edge surface towards the component body. It is additionally possible that thereby a higher strength of the coating in the layers situated below the coating surface is made available, with the result that their mechanical strength during operation can be improved.

For improving these characteristics it is preferred if the adaptive coating of the outer coating surface has a hardness, which is selected from a range having a lower limit of HV 40 and an upper limit of HV 1000, in particular from a range having a lower limit of HV 100 and an upper limit of 300, or according to another preferred embodiment, the hardness of the second surface, lying opposite the coating surface and pointing in the direction towards the component body, is selected from a range having a lower limit of HV 400 and an upper limit of HV 1600, in particular from a range having a lower limit of HV 650 and an upper limit of HV 1000.

It is possible that the adaptive coating is made of several different sub-layers. Even if this is not the preferred embodiment of the invention—since it is preferred if the properties merge into one another in a continuous way from the outer coating surface in the direction towards the component body—this embodiment may help to simplify the production of the adaptive coating, since layers having different compositions can be deposited on the component body one after the other, with the result that the effort in terms of open-loop control and closed-loop control can be reduced during the coating process.

In the preferred embodiment, the adaptive coating is embodied to be at least partly metallic. Compared to polymer layers, a higher durability of the adaptive coating is thereby achieved. It is additionally possible to achieve a greater variability in terms of the composition of the coating, since only a few polymers are suitable for the provided use of the component. Due to the adaptive coating exhibiting an at least partly metallic design, it is easier to take into account the different loading cases of the component, so that the invention may be used in a broader field. It is furthermore advantageous that the adaptive coating thus has a better thermal conductivity, so that one can better omit undesired phase transformations in the coating, and thus, the coating exhibits the at least approximately original phase composition over a longer period of time, so that its behavior during operation stays at least approximately the same over a longer period of time.

Within the course of the tests carried out for the invention it has shown that adaptive coatings are particularly suitable if they are formed by a multi-element system, with at least one element being selected from a group including transition metals, transition metal nitrides, transition metal carbides, transition metal oxides, as well as mixtures thereof; and according to one embodiment, an additional element of the multi-element system is for this purpose selected from a group comprising Sn, Mg, Al, In, Bi, Si, Ni, Ag, Cr and Fe. The adaptive coating particularly includes the elements Ag and Cr or CrN or the elements Ag, SN or CrN, with the Ag content decreasing from the outer coating surface in the direction towards the component body, or the elements Sn and Cr or the elements Cu and Cr and optionally Sn, with the Sn content decreasing from the outer coating surface in the direction towards the component body, or the elements AG and Ti and optionally Sn, with the AG content decreasing from the outer coating surface in the direction toward the component body. Furthermore, adaptive coatings have turned out to be advantageous, which are made of a tin bronze or an aluminum bronze, with optionally at least one of the elements chromium nitride, Fe, Cr, Ni, Ag being contained.

It is generally possible for the adaptive coating to contain also the elements Ag or Cr, Ag and Sn and Cr, or Cu and Cr, or Cu and Sn and Cr, or Cu and Al and Fe and Cr, or Ag and Ti, or Ag and Sn and Ti without the previously mentioned conditioned that the content of at least one element being varied within the coating.

According to another embodiment of the component it is provided that the adaptive coating is at least approximately or completely free from abrasive particles, i.e. free from particles that would cause an abrasion at the toothing of an additional component of the assembly which toothing is in meshing engagement with the toothing of the component. The quality increase is thus mainly achieved by deformation work carried out at the adaptive coating itself and not by a targeted material removal in the region of the meshing engagement, so that the additional component, i.e. the above-described component exhibiting the "embossing toothing" remains undamaged. By preventing material abrasion, the ingress of dirt into a lubricating oil provided for lubricating the toothing is reduced, so that this oil can be used for a longer time. Since the lubricating oil does not contain any impurities originating from such an abrasion, it is consequently possible for the outer coating surface to be designed to be harder, because no arrangements in terms of embedding these particles of dirt into soft matrix particles of the coating must be taken, with the result that the load capacity of the adaptive coating can be improved.

For improving the adhesion of the adaptive coating at the component body, it is possible to arrange a bonding layer between the adaptive coating and the component body.

A better oil absorption of the adaptive coating or a better capacity of the adaptive coating to keep oil and consequently a reduction of the abrasion is achieved if the adaptive coating is provided with a porosity, with the porosity being particularly between 0.5% and 20%, preferably between 5% and 12%. The pores in the adaptive layer preferably have a diameter of not more than 2 μm, in particular 0.5 μm.

In a variant of embodiment, the porosity decreases from the outer coating surface in the direction towards the component body. In other words: A gradient of the porosity is embodied in the adaptive coating. It is one the one hand possible to achieve the above-described improved capacity to keep oil and on the other hand an improved adhesion of the adaptive coating at the component body can be achieved.

To provide a clearer understanding, the invention will be described in more detail below with reference to the appended drawings.

Figure 2:
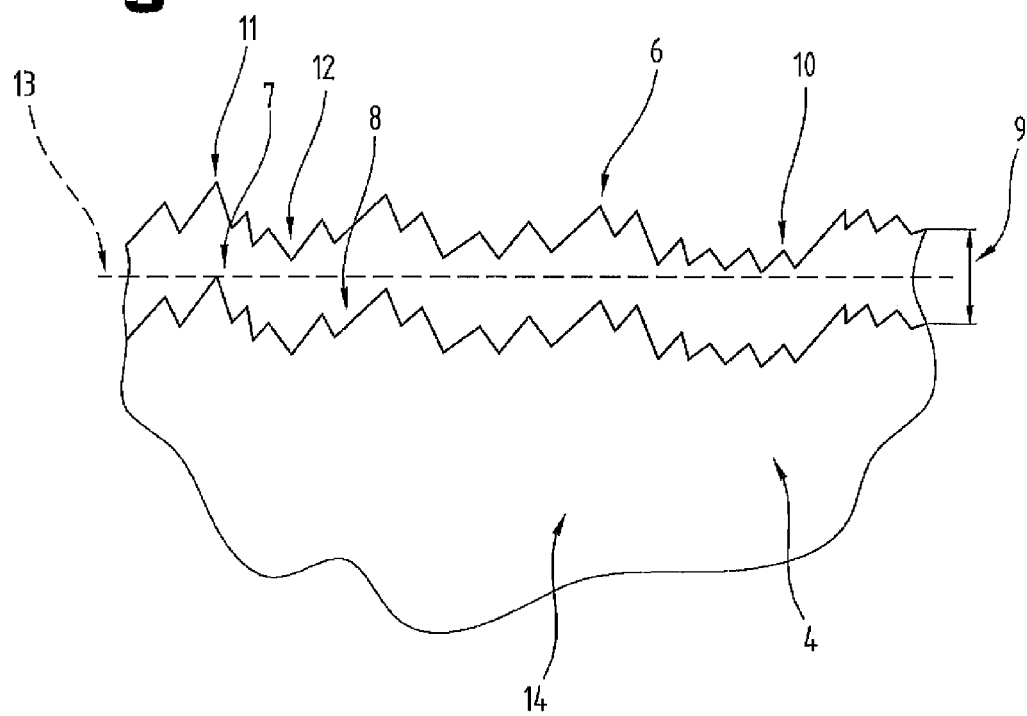
Figure 3:
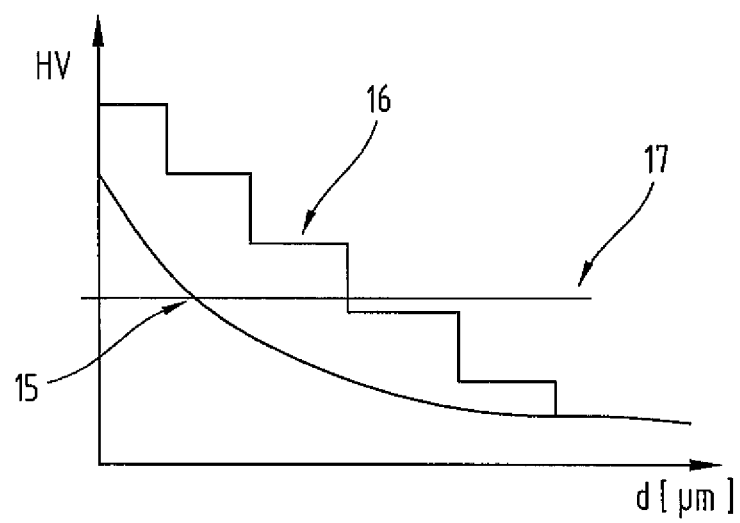
Figure 4:
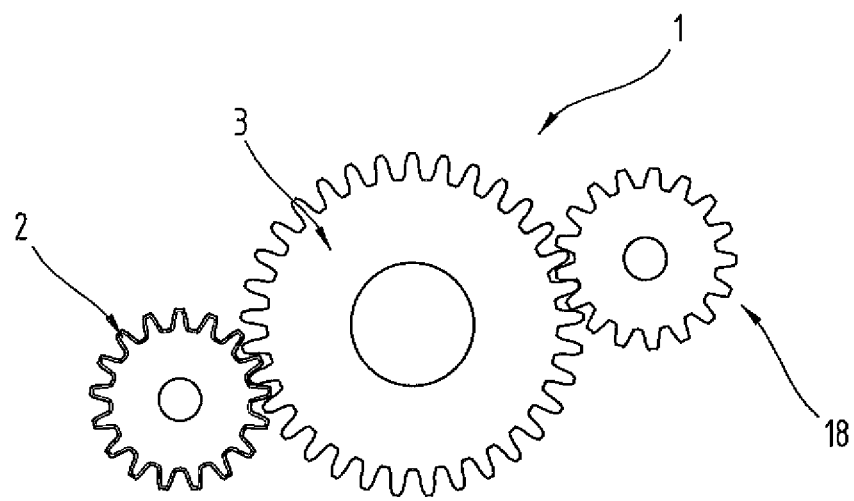
Figure 5:
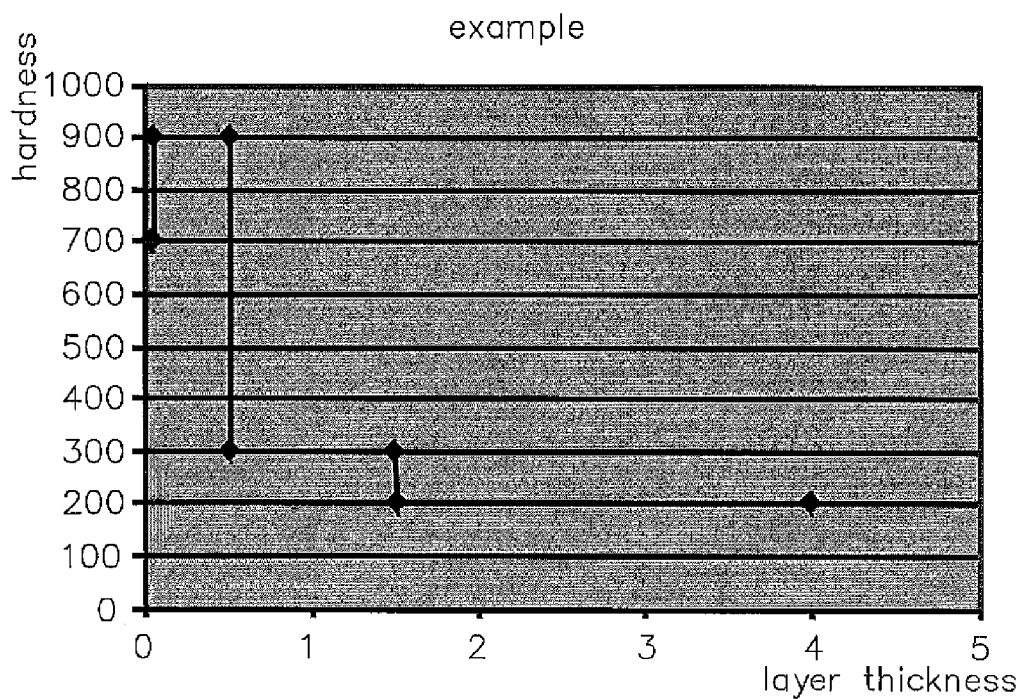
Figure 6:
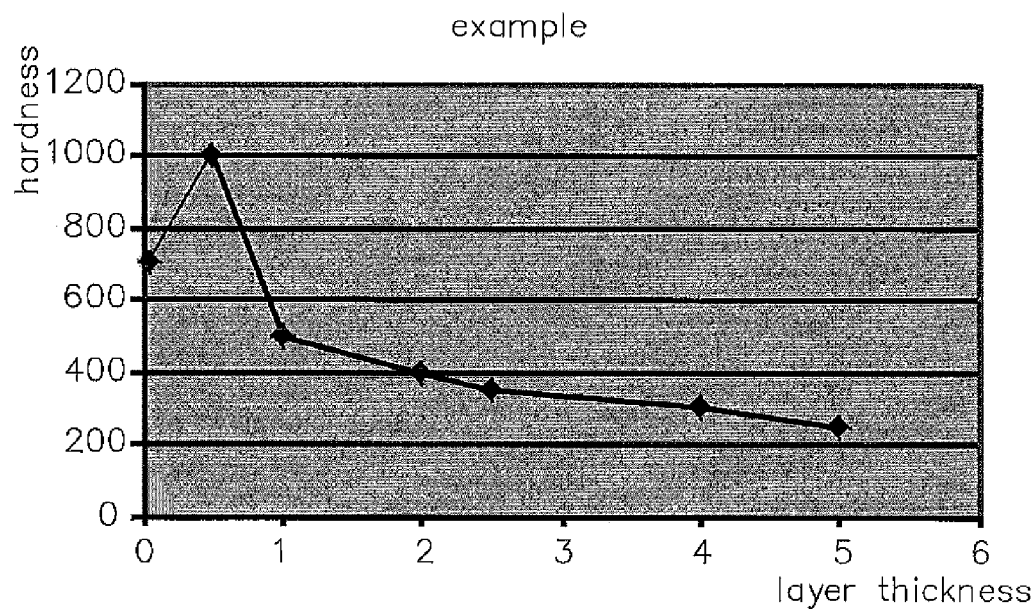
Figure 7:
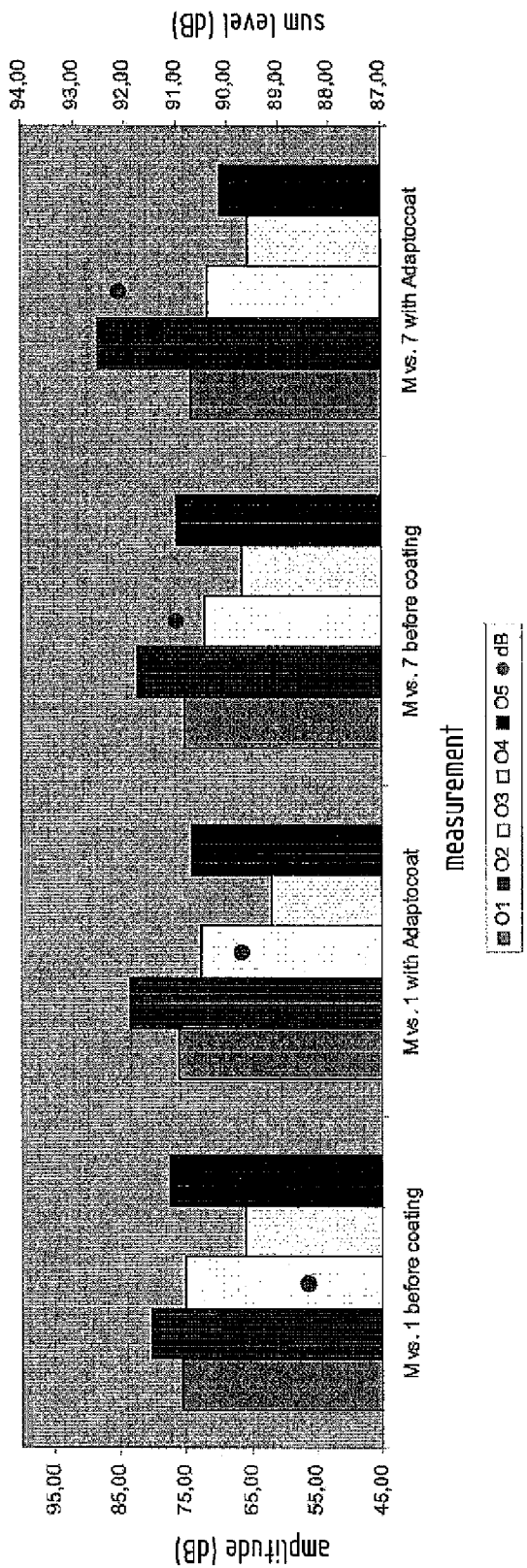
Figure 8:
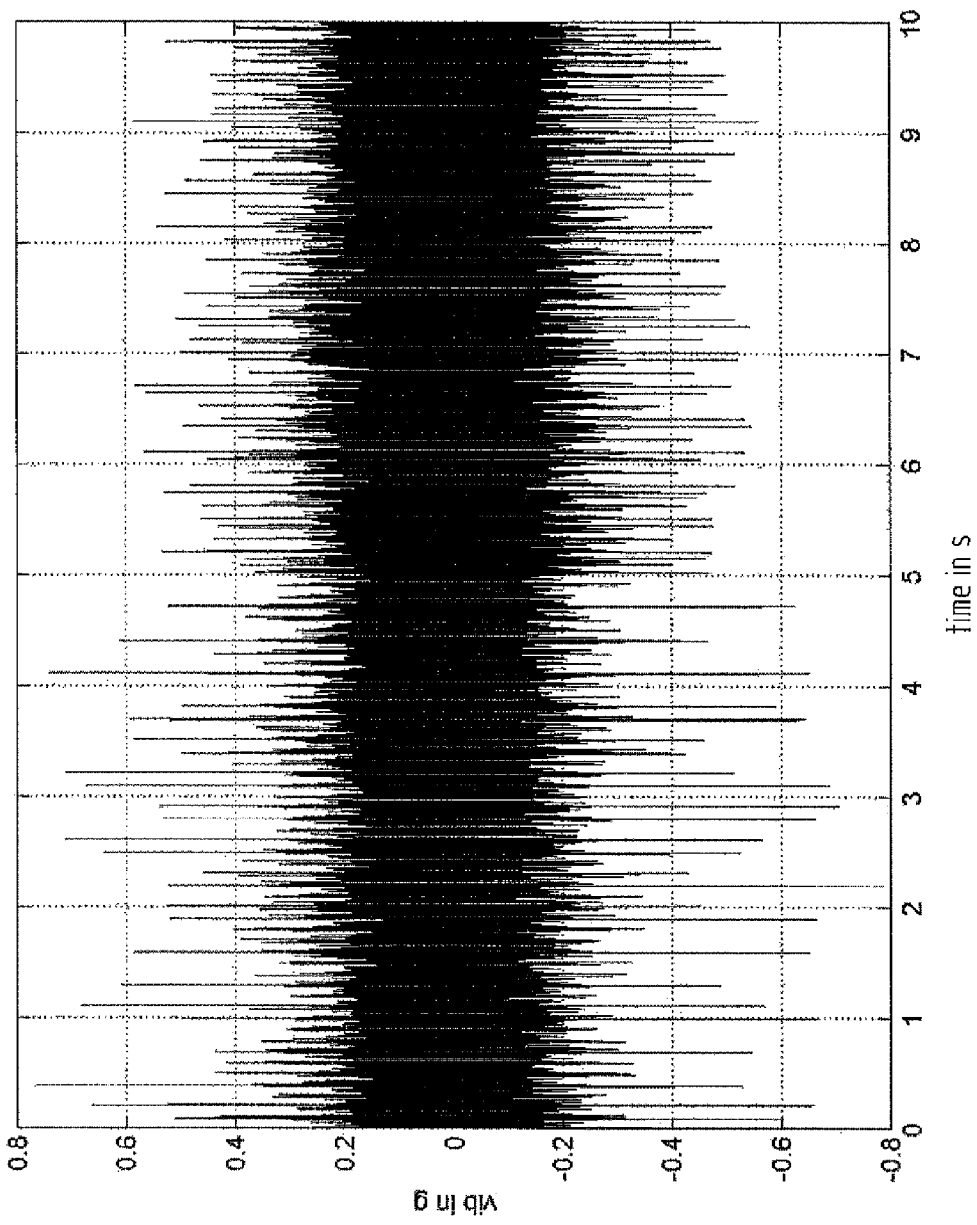
Figure 9:
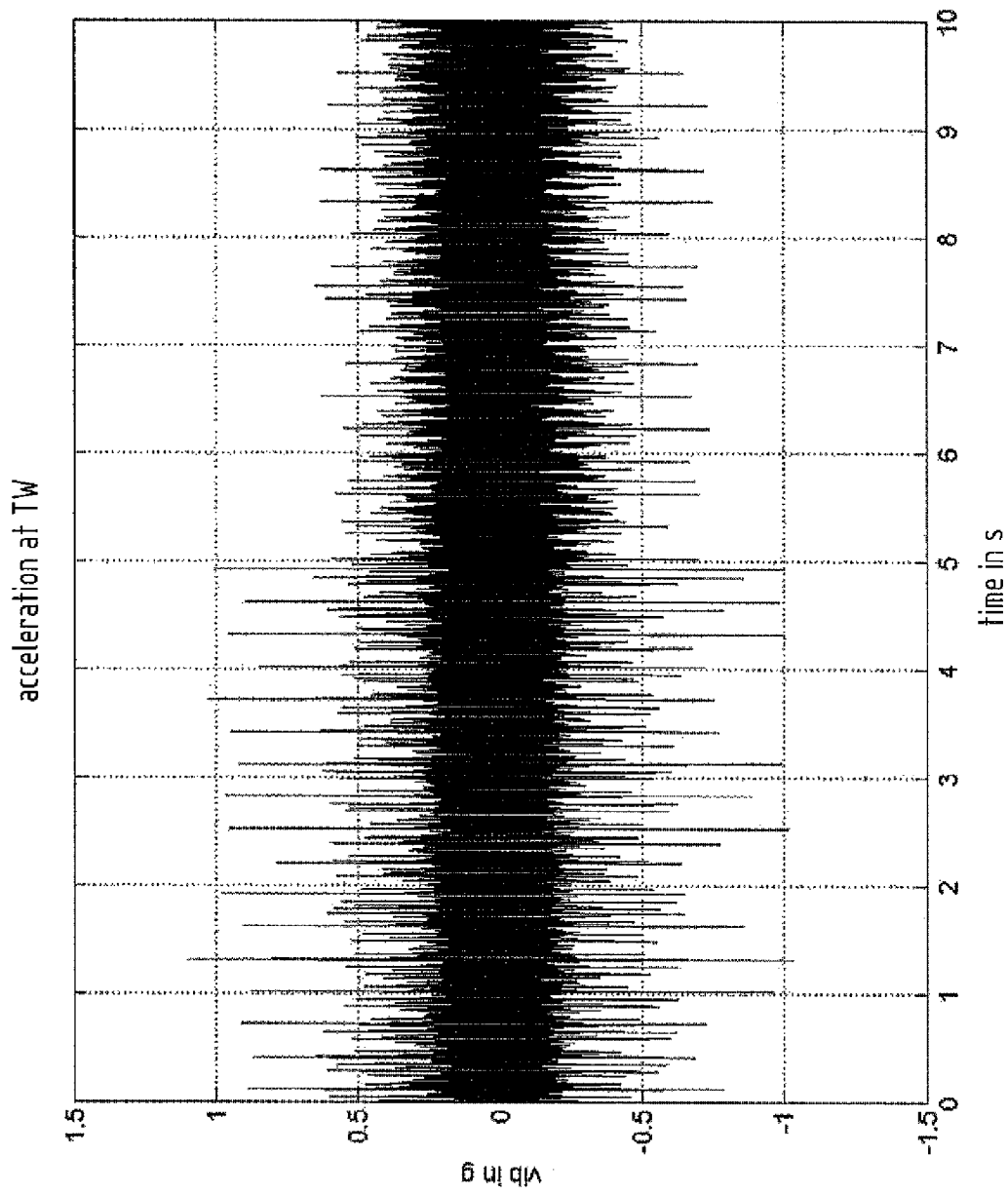
Figure 10:
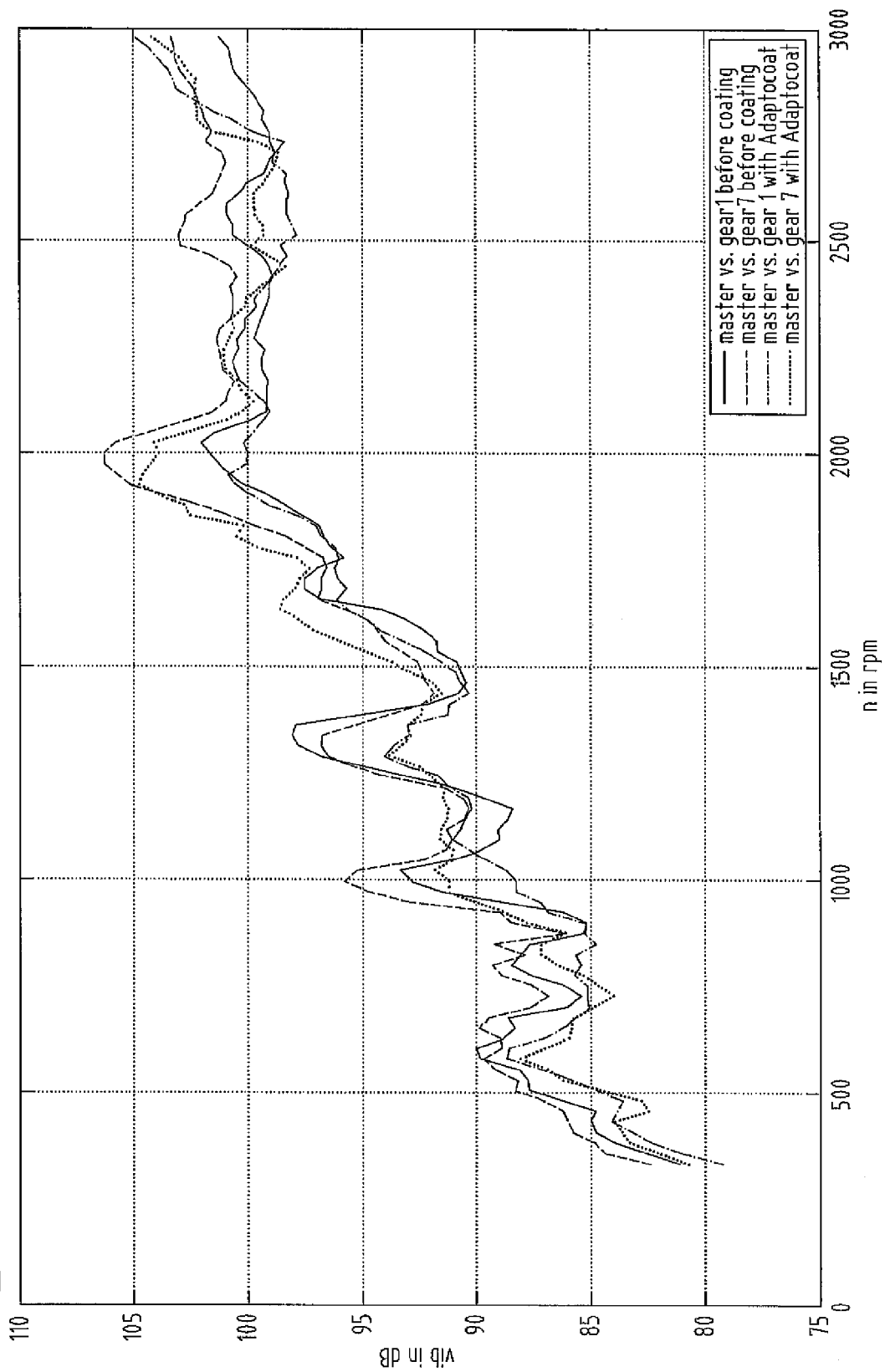
Figure 11:
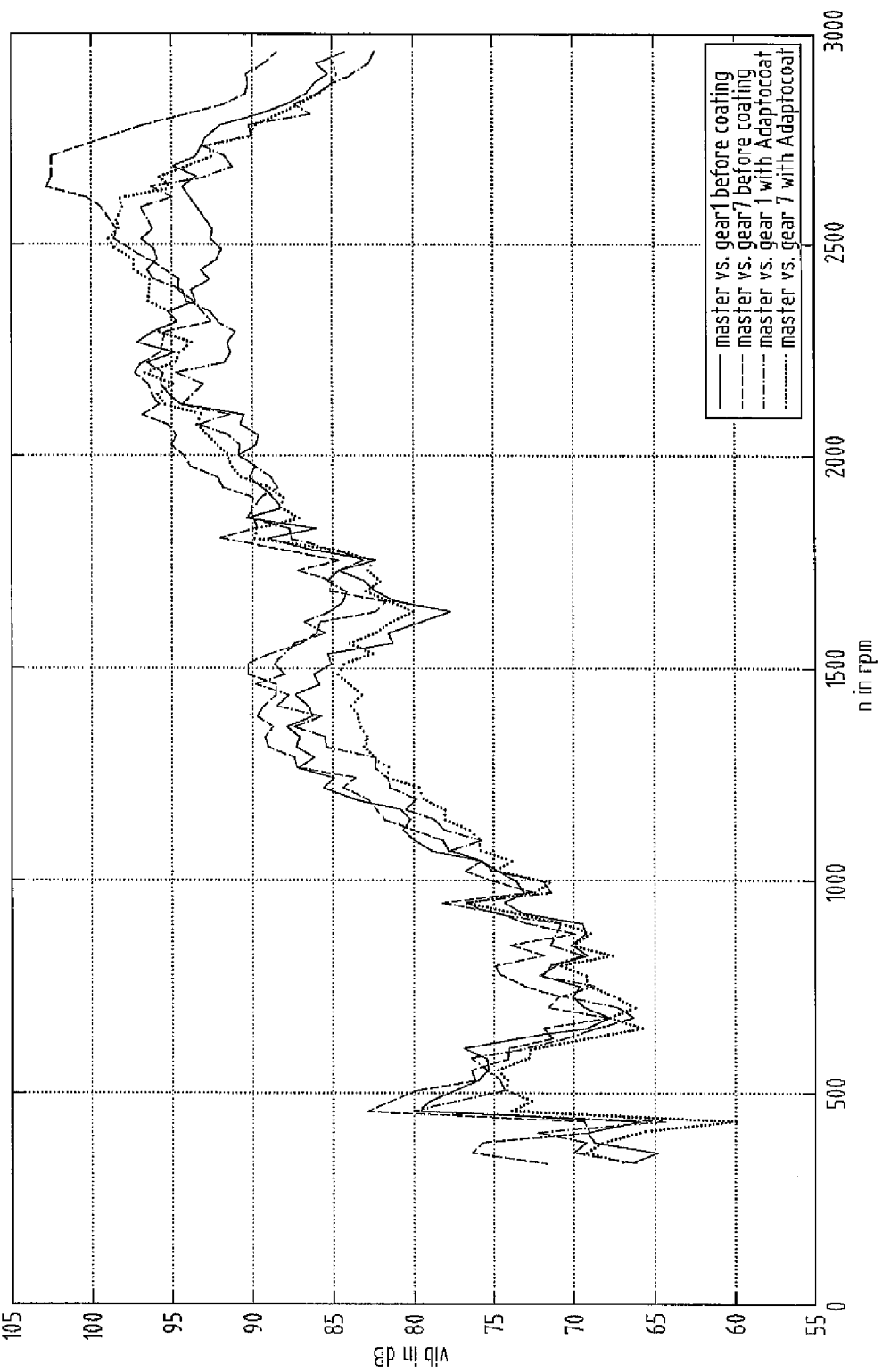
Figure 12:
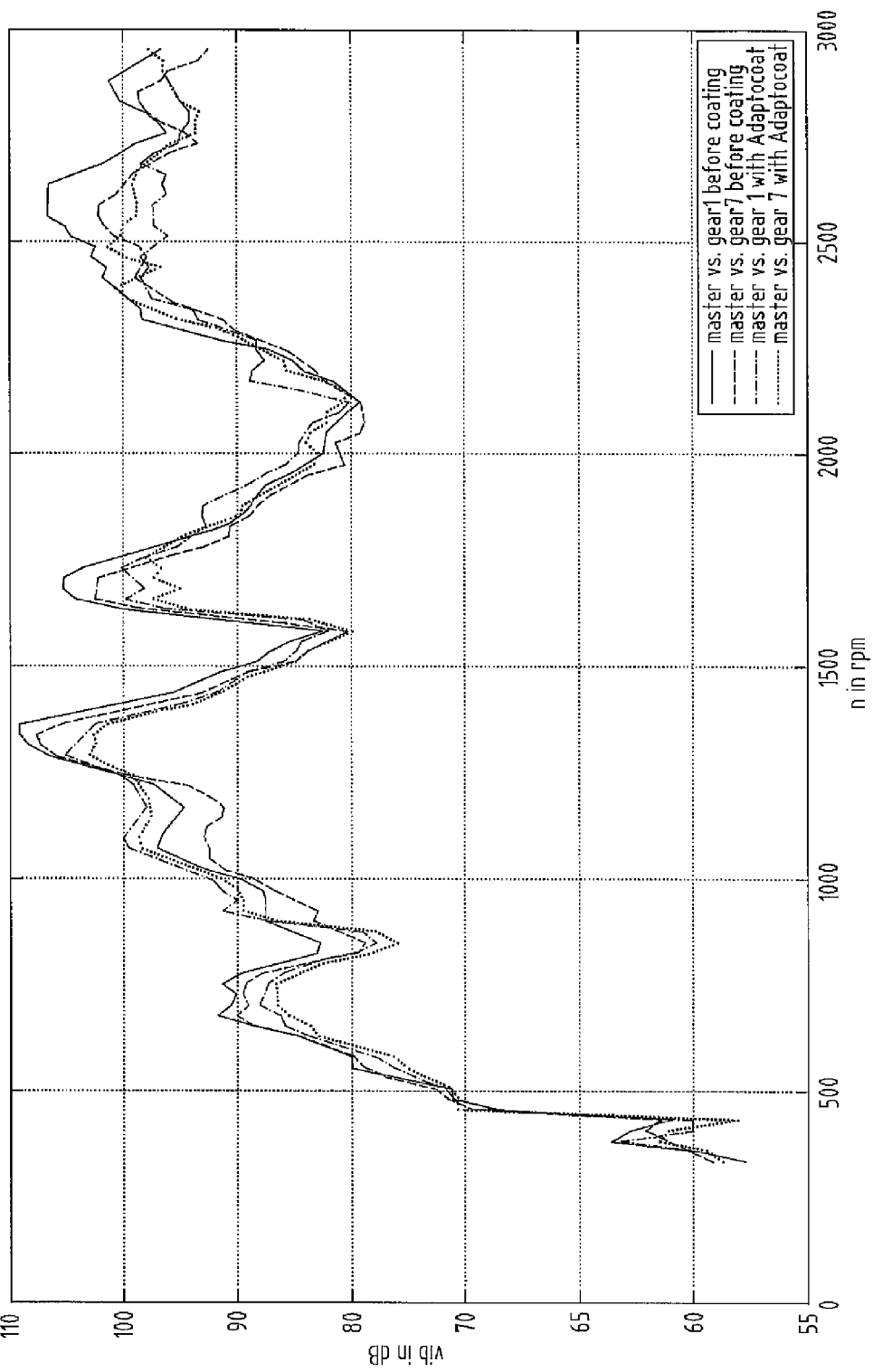

The simplified, schematic drawings illustrate the following:

FIG. 1 an assembly made of two toothed wheels with toothings which are in meshing engagement with each other in lateral view;

FIG. 2 a section of surface profile of a component equipped with an adaptive coating;

FIG. 3 two hardness profiles of the adaptive coating:

FIG. 4 another embodiment of the assembly in lateral view;

FIG. 5 the hardness profile of an exemplary coating;

FIG. 6 the hardness profile of another exemplary coating;

FIG. 7 the illustration of an order analysis;

FIG. 8 the unconditioned signal of a first experiment of an order analysis according to FIG. 6;

FIG. 9 the unconditioned signal of a second experiment of an order analysis according to FIG. 6;

FIG. 10 the profile of a run-up measurement as sum level for any harmonic fundamental oscillations and overtones;

FIG. 11 the profile of the first-order run-up measurement with respect to the sum level according to FIG. 9;

FIG. 12 the profile of the second-order run-up measurement with respect to the sum level according to FIG. 9;

FIG. 13 the profile of the third-order run-up measurement with respect to the sum level according to FIG. 9;

FIG. 14 the profile of the fourth-order run-up measurement with respect to the sum level according to FIG. 9.

Firstly, it should be pointed out that the same parts described in the different embodiments are denoted by the same reference numbers and the same component names and the disclosures made throughout the description can be transposed in terms of meaning to same parts bearing the same reference numbers or same component names. Further-more, the positions chosen for the purposes of the description, such as top, bottom, side, etc., relate to the drawing specifically being described and can be transposed in terms of meaning to a new position when another position is being described.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

FIG. 1 shows an assembly 1 comprising a component 2 as well as an additional component 3. The component 2 has a toothing 4 in the form of a spur gearing. The component 3 has also a toothing 5 in the form of a spur toothing. Both of the toothings 4, 5 are in meshing engagement with each other when the components are in operation, so that e.g. component 2 is driven by component 3 if component 3 is connected to a driving device not shown. The toothing 4 of the component 2 has an adaptive coating 6 at its and face.

Both of the components 2, 3 are designed to be spur-toothed spur gears. The invention is nevertheless not limited to spur gearings. It is generally possible that the adaptive coating 6 is applied to all known kinds of toothings—optionally having a height crowning and/or a crowning—i.e. for example also to helical gearings, etc. It is furthermore possible that the adaptive coating 6 is applied to both external toothing and internal toothing.

Although the embodiment of the component 2 as a toothed wheel represents the preferred embodiment of the invention, it is generally possible for other components which have a toothing to be equipped with the adaptive coating 6, e.g. gear rods.

At its end face, the toothing 4 is provided with the adaptive coating, preferably across the entire circumference. Within the scope of the invention it is also possible that only parts of the end face surface of the toothing 4 are coated, i.e. for example only the tooth flanks or only one of the tooth flanks, such as for example if the toothed wheel is not intended to be operated in both directions of rotation.

In the embodiment shown, the toothing 5 of the additional component 3 has no adaptive coating 6, in particular if this component 3 is the powered component 3 and the component 2 is the component 2 driven by component 3, as it has been described above. In this case, the toothing 5 of the additional component 3 has a higher toothing quality than the toothing 4 of the component 2, so that the component 3 acts as "embossing wheel" for the toothing 4 of the component 2 when the assembly is in operation.

It is nevertheless also possible to also provide its toothing 5 at least partially with the adaptive toothing 6, and it is possible for the composition or the property profile of that coating 6 to be optionally different from that coating 5 of the toothing 4 of component 3, although it also is possible for both of the toothings 4, 5 to have the same adaptive coating 6 having an identical property profile. It is also with this embodiment of advantage if the additional component 3 acts as "forming wheel", for which purpose its toothing 5 may have the higher toothing quality of the two toothings 4, 5 and/or the adaptive coating 6 of the toothing 5 of the additional component 3 has a higher hardness than the adaptive coating of the toothing of component 2 at least in the external region, i.e. that region which contacts the toothing 4 of the component 2.

As already stated above, it is due to the adaptive coating 6 possible to improve the toothing quality of the toothing 4 of component 2 in terms of certain properties by letting this adaptive coating at least partially deform already in the running-in phase of the meshing toothings 4, 5. These being the case, irregularities of the surface of the toothing 4 of component 2 are at least partially compensated, i.e. leveled, by pressing the toothing 5 of the additional component 3. It should at his point be noted that both components 2, 3, i.e. both toothed wheels, have a fixed axial distance, so that none of the two components 2, 3 moves towards the respective other component 2, 3.

In order to illustrate this effect, FIG. 2 shows a schematic section of the surface geometry of the toothing 4 with an adaptive coating 6 applied thereto. As can be clearly seen, the microgeometry of the toothing 4 has a roughness profile having elevations 7 and depressions 8. As the entire surface of the toothing 4 is at least approximately coated with an identical layer thickness, this contour of the microgeometry is for manufacturing reasons at least approximately copied to an outer coating surface 10 of the adaptive coating 6, that gets in contact with the surface of the toothing 5 of the additional component 3, i.e. the opposing toothed wheel, during operation. During operation, with the toothing 5 of the additional component being in meshing engagement with the toothing 4, the thereby transmitted forces brings the material of the profile peaks 11 of the adaptive coating 6 into, in particular adjacent, profile valleys 12, so that the contour of the outer coating surface 10 of the adaptive coating at least approximately levels and thus, an at least approximately flat outer support layer 13 is produced, as illustrated in FIG. 2 by means of dashed line. It is for this reason also advantageous if the toothing 5 of the additional component 3, i.e. the, in particular driven opposing wheel, has a higher toothing quality than the toothing 4, since this additional component 3 acts as "forming wheel". It should nevertheless be mentioned that the flatness of the outer support layer 13 depends on the toothing quality of the toothing 4; it is therefore absolutely possible for this support layer 13 to still have a profiling, which is nevertheless smaller than the original profiling, with an improvement of the toothing quality being achieved in any case, however. It is for example possible to use the adaptive coating 6 during the running-in for turning a quality 8 toothing 2 into a quality 7 to 6 toothing 2 at noticeably lower production costs. Once the deformation of the adaptive coating 6 is carried out, the hard substrate of the component 2, or the harder layers of the adaptive coating 6 situated in this region, counteract another deformation, as will be explained in more detail below.

Apart from bringing material from the profile peaks 11 into the profile valleys 12, there is also the possibility that the profile peaks 11 are at least partially compressed, provided that the adaptive coating 6 has been produced exhibiting a porosity, with this porosity contributing to achieving a better capacity of the adaptive coating 6 to keep oil at the same time. This being the case, the porosity is preferably between 0.5% and 20%, in particular between 5% and 12%, which means that between 0.5% and 20%, in particular between 5% and 12%, of free pore volume is present in the adaptive coating 6, with particularly at least a large portion, i.e. up to a portion of at least 20% open pores being present—with reference to the absolute pore volume of the adaptive coating 6. It is in this context also of advantage if the pores of the adaptive coating 6 have a maximum diameter of 2 µm, in particular of 0.5 µm. In order to improve the adhesion of the adaptive coating 6 or the strength of the adaptive coating 6 in spite of porosity it is advantageous if the porosity of the outer coating surface 10 decreases in direction towards a component body 14 of the component 2. It is for example possible for the porosity to decrease steadily, e.g. linearly or exponentially, or gradually, for example by steps of 5%, from a value of 20% at the outer coating surface 10 to a value of 0% at the boundary surface to subjacent component body 14—or an intermediate layer between the adaptive coating 6 and the component body 14. The porosity in the adaptive coating 6 can be generated by increased pressure or lower coating temperature or the addition of a chemically or thermally removable element (e.g. a metal or a polymer). A porosity gradient is e.g. achieved if the temperature drops and/or the pressure rises during deposition or if the bias voltage is lowered during deposition.

For forming the described support layer 13, the adaptive coating 6 is deposited having a maximum layer thickness 9 of 5 μm. The layer thickness 9 is nevertheless finally determined by the toothing quality of the toothing 4 to be coated. For a quality 6 toothing 2 having a pitch circle diameter of between 50 mm and 125 mm and a standard module of between 2 to 3.55, which can exhibit a maximum profile form variation ff of 8 μm and an individual pitch fp of 7 μm, a layer thickness 9 of not more than 5 μm, in particular a layer thickness 9 selected from a range between 3 μm and 4 μm is used. It is however preferred if the support layer 13 is embodied by at least 0.5 μm, in particular at least 2 μm, above the highest peak 7 of the surface profile of the toothing 4. For this reason, layer thicknesses 9 of up to a maximum of 5 μm are used, even if the roughness profile has considerably lower height differences between the peaks 7 and the valleys 8.

It is preferred if the adaptive coating 6 is at least partially metallic, i.e. that at least individual elements of the preferably used multi-element system are made of metals or metal alloys. It is principally also possible to use polymer materials for the adaptive coatings 9, such as PAI or PPEK, Teflon with or without additives, incorporated into a metal matrix or additives such as metals or metal sulfides, metal carbides or metal nitrides, incorporated into the polymer material.

At least one element of the multi-element system is selected from a group including transition metals, transition metal nitrides, transition metal carbides, transition metal oxides, as well as mixtures thereof. The portion of this element with respect to the adaptive coating 6 is between 0% by weight and 90% by weight, in particular between 4% by weight and 30% by weight. It is preferred if this element is present to be particulate, having a maximum size of particles of 0.3 μm, in particular having a particle size of between 0.03 μm and 0.1 μm.

A further element of the multi-element system is preferably selected from a group including Sn, Mg, Al, In, Bi, Si, Ni, Ag, Cr and Fe, with their percentage in the adaptive coating 6 being between 5% by weight and 80% by weight, in particular between 20% by weight and 50% by weight. The maximum particle size of this further element is 0.5 μm, this element has in particular a particle size of between 0.01 μm and 0.2 μm.

According to a first preferred embodiment, the adaptive coating 6 contains the elements Ag and Cr or CrN, with the content of Ag decreasing from the outer coating surface in the direction towards the component body. This being the case, the portion of Ag can be between 2% by weight and 98% by weight. The rest is made of Cr or CrN.

According to another preferred embodiment, the adaptive coating 6 includes the elements Sn and Cr, with the content of Sn decreasing from the outer coating surface in the direction towards the component body. This being the case, the portion of Sn can be between 6% by weight and 94% by weight. The rest is made of Cr.

An adaptive coating 6 containing the elements Ag and Ti has also turned out to be advantageous, with the content of Ag decreasing from the outer coating layer in the direction towards the component body. This being the case, the portion of Ag can be between 3% by weight and 97% by weight. The rest is made of Ti.

Also adaptive coatings 6 are preferred which are formed from a copper bronze or an aluminum bronze, optionally having a portion of Cr. The portion of Cu in the copper bronze may be between 98% by weight and 60% by weight, that of Sn between 0% by weight and 12% by weight, or the portion of Al in the aluminum bronze can be between 0.5% by weight and 20% by weight. Provided that Cr is contained, its portion is between 0.1% by weight and 80% by weight.

Preferred compositions of the adaptive coating can be seen in the following table 1. Any details relating to the composition are given in % by weight. Preferred parts of the portions of the individual elements are written in brackets.

TABLE 1

Composition of the adaptive coating 6

| Example No | Ag | Cr | CrN | Sn | Ti | Al | Cu | Additional elements |
|---|---|---|---|---|---|---|---|---|
| 1 | | | 100 | | | | | |
| 2 | 20 | 75 | 5 | | | | | |
| 3 | 50 | 30 | 20 | | | | | |
| 4 | 55 | 40 | 5 | | | | | |
| 5 | 65 | 30 | 2 | 3 | | | | |
| 6 | | 10 | 10 | 5 | | 10 | 60 | 5Fe |
| 7 | | 5 | 4 | 6 | | 12 | 70 | 3Fe |
| 8 | | 8 | 4 | 6 | 22 | | 60 | |
| 9 | 90 | 8 | 2 | | | | | |
| 10 | | 10 | 2 | | | 8 | 76 | 4Fe |

In the preferred embodiment of the adaptive coating 6, the latter has a hardness gradient having an increasing hardness starting from the outer coating surface 10 in the direction towards the component body 14. This being the case, the adaptive coating 6 can have a hardness at the outer coating surface 10, which is selected from a range having a lower limit of HV 40 and an upper limit of HV 1,000, in particular from a range having a lower limit of HV 60 and an upper limit of HV 300. At the second surface, opposite the outer coating surface 10 and pointing in a direction towards the component body 14, the adaptive coating 6 has a hardness, which is selected from a range having a lower limit of HV 400 and an upper limit of HV 2,500, in particular from a range having a lower limit of HV 650 and an upper limit of HV 1,600.

To illustrate this, FIG. 3 schematically shows two profiles 15, 16. The absciss here shows the layer thickness 9, originating from the surface of the toothing 2 in the direction towards the outer coating surface, and the ordinate shows the plastic hardness given in HV, measured by means of a Fischerscope®. The horizontal line 16 marks the hardness of steel.

The term plastical hardness refers to the universal hardness without taking into consideration the elastic deformation component.

The profile 15 shows the preferred embodiment of the invention. The hardness does here not decrease gradually, as in profile 16, but continuously, with the profile 15 running linearly or preferably following an exponential function.

Table 2 shows examples for hardness profiles, measured at different layer depths of the adaptive coating 6, originating from the surface of the toothing 4, or optionally an intermediate layer between this surface and the adaptive coating 6.

For better clarity, the hardness values are rounded up or down to the nearest 50 value.

TABLE 2

Hardness profiles

| Example No | Layer thickness in µm | | | | | | | | | |
|---|---|---|---|---|---|---|---|---|---|---|
| | 0.5 | 0.1 | 1.5 | 2 | 2.5 | 3 | 3.5 | 4 | 4.5 | 5 |
| 1 | 800 | 500 | 300 | 300 | 200 | 200 | 200 | | | |
| 2 | 800 | 1000 | 500 | 300 | 250 | 200 | 200 | 150 | 150 | 150 |
| 3 | 700 | 600 | 400 | 400 | 300 | 300 | 300 | | | |
| 4 | 700 | 1300 | 500 | 300 | 200 | 200 | | | | |
| 5 | 800 | 400 | 300 | 300 | 200 | 200 | 200 | 150 | 100 | |
| 6 | 1000 | 800 | 800 | 700 | 600 | 300 | 300 | 300 | 300 | 250 |
| 7 | 600 | 400 | 400 | 240 | 220 | 200 | | | | |
| 8 | 700 | 600 | 500 | 400 | 300 | 200 | 150 | | | |
| 9 | 700 | 2000 | 800 | 500 | 500 | 300 | 300 | | | |
| 10 | 500 | 400 | 300 | 300 | 300 | 300 | 250 | 220 | 220 | |

In a preferred embodiment, the outer coating surface 10 consists exclusively of the respective softer component of the multi-element system, such as e.g. Ag or Sn. It is optionally possible that a portion of not more than 0.5% by weight up to 100% by weight of the respective harder element, such as e.g. Cr, CrN, or Ti, in order to achieve for the friction to be reduced and/or for the corrosion resistance to be improved.

The deposition of the adaptive coating 6 onto the toothing 4 of component 2 can be performed by very different methods, such as e.g. electrolytic deposition Cr and Ag or Ag and Sn, by applying PVD methods, such as sputtering, e.g. mixed targets or different individual targets having rotating substrates (e.g. toothed wheels in the center) by injecting mixed powders of different compositions, etc.

In a simple embodiment, it is possible for the hardness gradient to be made by a multi-layered design of the adaptive coating 6 having several different sub-layers, and the sub-layers can have different compositions. It is possible to deposit single-layers, multi-layers or nanolaminates.

In order to achieve the hardness gradient, the composition of the adaptive coating 6 can vary across the layer thickness 9 in such a way, that a minority element on the outer coating surface 10 becomes the majority element of the other surface facing the component body 14, and that an additional element of the multi-element system has the exactly reverse profile, i.e. the majority element turns into the minority element. In other words, there is the possibility that the element forming the matrix is substituted by another element on the other surface of the adaptive coating 6, so that the matrix changes to another matrix across the layer thickness 9.

It is e.g. possible to chose a sequence of 100 Cr→Cr 70→Ag 30→Ag 60 Cr 40→Ag 95/Cr5.

For the above reasons, the adaptive coating 6 is free from abrasive particles.

In order for the adhesive strength of the adaptive coating 6 at the toothed system 4 of the component 2 to be increased, it is possible to arrange an bonding layer between the latter and the adaptive coating 6, such as Cr, Ti, Mo, Ni. It nevertheless also possible to achieve an improved adhesion strength by forming diffusion bondings at the boundery surface between the component body 14 and the adaptive coating, by e.g. subjecting the component to a heat treatment after the coating, e.g. 2 hours at a temperature of 200° C. or 1 hour at a temperature of 150° C. followed by a 1 hour treatment at a temperature of 250° C. It is preferred if the component 2 and/or the adaptive coating contains Chrome and/or titanium for this purpose.

For the sake of completeness, FIG. 4 shows another embodiment of an assembly 1. Apart from the component 2 and the additional component 3 it has a third component 18, with the additional component 3 having the highest quality of the toothed system of all three components 2, 3, 18.

The invention can for example be applied to the field of camshaft toothed wheels or differential gear-shaft units. Due to the forming wheel effect, the invention is preferably used in assemblies having a 1:1 transmission ratio.

As already stated, it is possible for both of the toothings 4, 5 of the components 2, 3 or of all components 2, 3, 18 of an assembly 1 to be coated, and also different compositions of coatings of the adaptive coating 6 can be used for the components 2, 3, 18. The toothing 4 of component 2 can e.g. be coated with CrNCrAg and the toothing 5 of component 3 can be coated with CrCuSn. Further examples are: CrN against CrAg, CrN against TiAg, TiN against CrAg, CrN against CrCuAlFe.

In order to verify the effect of the adaptive coating 6, frequency measurements are carried out. The adaptive coatings 6 having a composition according to the following table 3 (test wheel 1) or table 3 (test wheel 7) have been applied to different toothed wheels of steel having different diameters. The hardness profile of these coatings 6 is shown in FIG. 5 (test wheel 1) or FIG. 6 (test wheel 7).

TABLE 3

Composition of an adaptive sample coating

| Layer | Thickness µm | Hardness HV | Material 1 | Material 2 | Material [% by weight] 1 | Material [% by weight] 2 |
|---|---|---|---|---|---|---|
| 0 | 0.05 | 700 | Cr | | 100 | |
| 1 | 0.051 | 700 | Cr | | 100 | |
| 2 | 0.051 | 900 | CrN | Ag | 80 | 20 |
| 3 | 0.51 | 900 | CrN | Ag | 80 | 20 |
| 4 | 0.512 | 300 | Cr | Ag | 30 | 70 |

TABLE 3-continued

Composition of an adaptive sample coating

| Layer | Thickness μm | Hardness HV | Material 1 | Material 2 | Material [% by weight] 1 | Material [% by weight] 2 |
|---|---|---|---|---|---|---|
| 5 | 1.5 | 300 | Cr | Ag | 30 | 70 |
| 6 | 1.51 | 200 | Cr | Ag | 10 | 90 |
| 7 | 4 | 200 | Cr | Ag | 10 | 90 |
| 8 | 4 | 200 | Cr | Ag | 10 | 90 |

TABLE 4

Composition of an adaptive sample coating

| Layer | Thickness μm | Hardness HV | Material 1 | Material 2 | Material 3 | % by weight 1 | % by weight 2 | % by weight 3 |
|---|---|---|---|---|---|---|---|---|
| 0 | 0.05 | 700 | Cr | | | 100 | | |
| 1 | 0.5 | 1000 | CrN | Cu | Sn | 80 | 20 | 1.5 |
| 3 | 1 | 500 | Cr | Cu | Sn | 8 | 90 | 2 |
| 4 | 2 | 400 | Cr | Cu | Sn | 5 | 90 | 5 |
| 5 | 2.5 | 350 | Cr | Cu | Sn | 2 | 90 | 8 |
| 6 | 4 | 300 | Cr | Cu | Sn | 2 | 90 | 8 |
| 7 | 5 | 250 | Cr | Cu | Sn | 0.5 | 93 | 6.5 |

FIGS. 7 to 9 show the graphical illustration of the order analysis of the oscillation frequencies shown according to $1^{st}$ to $5^{th}$ order (overtone). The measurement was carried out at a constant speed of 1000 rpm (alternating moment 6 Nm, 10 Hz). The test wheels 1 (diameter of pitch circle 50 mm) and 7 (diameter of the pitch circle 125 mm) were counter-checked against a wheel defined to be the master-gear ("M" in the Figs.) on a test station for toothed wheels before and after the coating.

In FIG. 7 (order analysis) the amplitude of the oscillation are given in db on the vertical axis on the right and the sum level is given in db on the vertical axis on the left.

It is striking that both of the coated test wheels ($2^{nd}$ and $4^{th}$ group from left) show an increasing amplitude of oscillations of $2^{nd}$ order as compared to the uncoated test wheel. The amplitudes of the oscillations of higher order however decrease with coated test wheels, so that altogether, a noticeable improvement of the noise characteristics of the coated test wheels as compared to uncoated test wheels can be stated, as shown in FIGS. 8 and 9, showing the raw signals for the order analysis. This being the case, the reduction of test wheel 1 (FIG. 8) is less strong developed than that of test wheel 7, as a comparison of the two Figures shows. These Figures each show the characteristics of an uncoated test wheel from left up to the center, and the characteristics of a coated test wheel from the center up to the left edge.

The FIGS. 10 to 14 show the evaluations of a run-up measurement in a speed range of between 200 rpm and 2000 rpm (alternating moment 6 Nm, 10 Hz). The test wheels correspond to those that have been used for the tests for FIGS. 6 to 9.

This check essentially proves the result described above.

The embodiments illustrated as examples represent possible variants of the component 2 and the assembly 1, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Particularly, the individual features illustrated in the embodiments shown in the FIGS. 1-4 may be construed as independent solutions proposed by the invention in their own right.

For the sake of good order, finally, it should be pointed out that, in order to provide a clearer understanding of the structure of the component 2 and the assembly 1, it and its constituent parts are illustrated to a certain extent out of scale and/or on an enlarged scale and/or on a reduced scale.

LIST OF REFERENCE NUMERALS

1 Assembly
2 Component
3 Component
4 Toothing
5 Toothing
6 Coating
7 Elevation
8 Depression
9 Layer thickness
10 Coating surface
11 Profile peak
12 Profile valley
13 Support layer
14 Component body
15 Profile
16 Profile
17 Line
18 Component

The invention claimed is:

1. Component comprising a component body which has a toothing, wherein an adaptive coating having a maximum thickness of 5 μm is applied to at least a portion of the toothing, wherein a surface of the toothing has a roughness profile with peaks and valleys forming a microgeometry, wherein an entirety of the coated portion of the toothing is at least approximately coated with an identical layer thickness with the adaptive coating having an outer surface coating, so that the roughness profile of the microgeometry of the surface of the toothing is copied to the outer coating surface of the adaptive coating, wherein the adaptive coating is plastically deformable to bring material of the peaks into the valleys between the peaks and produce a support layer, and wherein the adaptive coating contains a gradient feature and consists of one of the following multi-component systems:
   Ag and Cr or
   Ag and CrN or
   Sn and Cr or
   Sn and CrN or
   Cu and Cr or
   Ag and Ti or
   Ag and Ti and Sn or
   a tin bronze or an aluminum bronze wherein the tin bronze or the aluminum bronze contains at least one of the elements chromium nitride, Fe, and Ag.

2. Component according to claim 1, wherein the adaptive coating has a hardness gradient that has an increasing hardness from an outer coating surface in the direction towards the component body.

3. Component according to claim 1, wherein the adaptive coating is made of several different sub-layers.

4. Component according to claim 1, wherein the adaptive coating comprises the elements Ag and Cr or CrN, or the elements Ag, Sn and Cr or CrN, with the content of Ag decreasing from the outer coating surface in the direction towards the component body and the portion of Ag being between 2% by weight and 98% by weight.

5. Component according to claim 1, wherein the adaptive coating comprises the elements Sn and Cr or the elements Cu and Cr and optionally Sn, with the content of Sn decreasing from the outer coating surface in the direction towards the component body and the portion of Sn being between 6% by weight and 94% by weight.

6. Component according to claim 1, wherein the adaptive coating comprises the elements Ag and Ti and optionally Sn, with the content of Ag decreasing from the outer coating surface in the direction towards the component body and the portion of Ag being between 3% by weight and 97% by weight.

7. Component according to claim 1, wherein the adaptive coating is at least approximately or completely free from abrasive particles.

8. Component according to claim 1, wherein a bonding layer is disposed between the adaptive coating and the component body.

9. Component according to claim 1, wherein the adaptive coating has a porosity of between 0.5% and 20%.

10. Component according to claim 9, wherein the pores in the adaptive coating have a maximum diameter of 2 μm.

11. Component according to claim 9, wherein the porosity decreases from the outer coating surface in the direction towards the component body.

* * * * *